United States Patent [19]

Herchenbach et al.

[11] Patent Number: 5,772,521
[45] Date of Patent: Jun. 30, 1998

[54] PROTECTIVE DEVICE FOR A DRIVESHAFT HAVING RADIAL SUPPORTING MEANS FOR THE PROTECTIVE CONE

[75] Inventors: Paul Herchenbach, Ruppichteroth; Horst Kretschmer, Köln, both of Germany

[73] Assignee: GKN Walterscheid GmbH, Lohmar, Germany

[21] Appl. No.: 745,389

[22] Filed: Nov. 8, 1996

[30] Foreign Application Priority Data

Nov. 8, 1995 [DE] Germany .................. 195 41 512.4

[51] Int. Cl.⁶ .................................................. F16D 3/84
[52] U.S. Cl. ........................... 464/170; 464/172; 464/175
[58] Field of Search .................................. 464/170, 172, 464/173, 175; 74/608, 609; 180/53.1; 280/240

[56] References Cited

U.S. PATENT DOCUMENTS

| | | | |
|---|---|---|---|
| 4,411,636 | 10/1983 | Buthe et al. | 464/172 |
| 4,435,166 | 3/1984 | Bondioli | 464/172 |
| 4,443,207 | 4/1984 | Buthe et al. | 464/172 |
| 5,173,082 | 12/1992 | Bondioli | 464/172 X |

FOREIGN PATENT DOCUMENTS

| | | | |
|---|---|---|---|
| 1214057 | 4/1960 | France | 464/170 |
| 2507266 | 12/1982 | France . | |
| 2550833 | 2/1985 | France | 464/170 |
| AS 22 05 798 | 4/1973 | Germany . | |
| 30 13 791 A1 | 10/1980 | Germany . | |
| 29 12 939 C2 | 5/1981 | Germany . | |
| 30 26 135 C1 | 10/1981 | Germany . | |
| 32 08 541 C1 | 6/1983 | Germany . | |
| 2045396 | 10/1980 | United Kingdom . | |
| 2079886 | 1/1982 | United Kingdom . | |
| 2121137 | 12/1983 | United Kingdom . | |

*Primary Examiner*—Eileen A. Dunn
*Attorney, Agent, or Firm*—Harness, Dickey & Pierce, P.L.C.

[57] ABSTRACT

The invention relates to a protective device which is supported on the two universal joints (2, 2') by connecting caps (8) and sliding ring. Furthermore, each connecting cap (8) is formed to allow a protective cone (12) to be connected thereto. Protective devices of said type provide protection against contact and are stationary, while the driveshaft (1) rotates. Each connecting cap (8) is attached by spokes (19) to a supporting ring (13) which supports the protective cone (12) from the inside. When the protective cone (12) is subjected to radial loads, for example if the driveshaft is stepped on unintentionally, the purpose of the above measure is to prevent the protective cone (12) from contacting the components of the universal joints (2, 2') which it covers. This measure ensures that in order to make the components of the universal joint (2, 2') accessible, for example for the purpose of sliding on a power take-off shaft, the protective cone can be made to be sufficiently resilient in the direction of the longitudinal axis, while at the same time being capable of accommodating high loads in the radial direction.

7 Claims, 3 Drawing Sheets

PROTECTIVE DEVICE FOR A DRIVESHAFT HAVING RADIAL SUPPORTING MEANS FOR THE PROTECTIVE CONE

BACKGROUND OF THE INVENTION

The invention relates to a protective device for a driveshaft. The driveshaft includes two universal joints each having two joint yokes and a cross member articulatably connecting the two joint yokes. The driveshaft also includes a connecting shaft which connects the two universal joints and extends along a longitudinal axis. Each universal joint includes a connecting cap which is intended to connect the connecting shaft, on the one hand, and to connect a protective cone on the other hand. The protective cone includes an intermediate sliding ring, which serves to be supported on a joint yoke. The protective cone is of a plastic material and, starting from the connecting cap, covers the universal joint along at least part of its length. Supporting means counteract any contact between the protective cone and the enclosed components of the universal joint if the protective cone is subjected to any external loads.

A protective device is described in DE 30 26 135 C1. Here, any radial forces applied to the protective cone from the outside can only be accommodated to a limited extent because the supporting ring is attached to the outside of the protective cone and is secured directly by the outside of the protective cone. Because the supporting ring is attached to the outside of the protective cone, high loads can nevertheless cause the protective cone to contact joint components, which may lead to the destruction of the funnel.

DE 29 12 939 C2 describes a protective device. Here, a bearing ring is attached to the inside of the protective connecting cap in the region of a fold valley. The bearing ring is divided and includes a fixed portion secured to the protective cone in the fold valley and an inner ring rotatable relative thereto. When the protective cone is subjected to external loads, it is deformed and the inner ring rests against one of the components. Ordinarily, it rests against the outer face of the joint yoke of the surrounded joint. However, as driveshafts used for agricultural applications are affected by a great deal of dirt, the bearing function is not ensured and the ring is destroyed.

To facilitate the lubrication of the joint covered by the protective cone and of the bearing region of the protective device on a joint yoke of the joint, the protective cone has to be suitable for being pulled off during maintenance work. DE 32 08 541 C1 describes how this is achieved. However, such axial removal is prevented by an assembly according to the state of the art as described in DE 30 26 135 C2.

Furthermore, state of the art devices according to DE 29 12 939 C2 and DE 30 26 135 C1 are disadvantageous in that the components provided therein to radially support the protective cone adversely affect the axial deformability of the protective cone. Axial deformability is necessary, within limits, to be able to connect the driveshaft to the power take-off shaft of a tractor. Since the joint components covered by the protective cone have to be accessible to the extent that it must be possible to take hold of the components and establish a non-rotating, axially secured connection with the power take-off shaft.

Furthermore, DE-AS 22 05 798 describes a boot for sealing a constant velocity universal joint. Here, the boot sealing the region between the outer joint part and a shaft is additionally fixed on a projection of a cage of the constant velocity universal joint. The resulting two portions of the boot each need to pass through only half the articulation angle between the outer joint part and the shaft. These boots are intended to seal the constant velocity universal joint and rotate with the joint. The boots do not protect against any contact, but are provided to encapsulate the lubricant needed to lubricate the joint. The additional fixing facility, furthermore, helps to ensure that the forces acting on the boot and resulting from the co-rotating lubricant are accommodated more easily.

SUMMARY OF THE INVENTION

It is an object of the invention to propose a protective device for a driveshaft used for agricultural applications, where the protective cone is effectively supported in the radial direction when subjected to external forces. The protective device at least permits the driveshaft to be connected to a driving member, such as the power take-off shaft of a tractor. Further, the protective cone can be designed so as to be axially deformable to a certain extent against radial deformation without adversely affecting the support provided by the protective cone.

In accordance with the invention, the supporting means includes a supporting ring which is attached to the connecting cap. The supporting ring's outer circumferential face serves to support the protective cone on part of its inner face. Also, the supporting ring is arranged with an axial distance from the connecting cap along the longitudinal axis.

An advantage of associating the supporting means with a supporting ring attached to the connecting cap is that support is provided inside the protective cone. The protective cone is able to contact the supporting ring radially without coming into contact with the components of the joint which it covers, even in cases of high radial loads.

Furthermore, by associating a supporting ring with the connecting cap, it is ensured that the supporting forces are introduced directly through the connecting cap into a joint. When forces are applied to the supporting ring, the connecting cap, due to being supported on the joint yoke and by means of the connected protective tubes, acts against the resulting tilting moment. Also, the connecting cap associated with the other end of the driveshaft improves the supporting effect with the help of its bearing means.

A further advantage is that the protective cone can be designed to be deformable in an axial direction in accordance with the deformation length required for making the covered joint components accessible to be able to connect the funnel to a driving or driven shaft.

To ensure that even in the case of a lightweight type of construction, high strength values and advantageous supporting conditions are achieved for the supporting ring. The supporting ring is attached to the connecting cap by spokes which are arranged to be distributed around the longitudinal axis. This results in an additional advantage in that, after the protective cone has been pulled off, the space formed between each two spokes provides access to the lubrication points of the joint to lubricate the cross member and the sliding profile.

To achieve a lightweight construction, in a sectional plane containing the longitudinal axis, the supporting ring includes a wall profile in the form of a horizontal U-profile. Between the arms and the web of the U-profile, reinforcing webs are provided which are circumferentially distributed around the longitudinal axis. In a further embodiment, at least some of the spokes form reinforcing webs. In addition to the outer circumferential face of the supporting ring, part of the outer contour of the spokes serves to support the protective cone.

According to a further embodiment, toward the connecting cap, the protective cone includes a portion which is provided with folds. The supporting ring and/or the outer contour of the spokes serve/serves to support the inner face of the fold valleys.

The invention allows the supporting ring, the spokes and the connecting cap to be produced in a one piece plastic injection-molded part. The plastic material is preferably HDPE (high-density polyethylene).

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention and its application in a driveshaft used to drive agricultural machinery are diagrammatically illustrated in the drawing wherein.

DETAILED DESCRIPTION OF THE DRAWINGS

Figure 1:
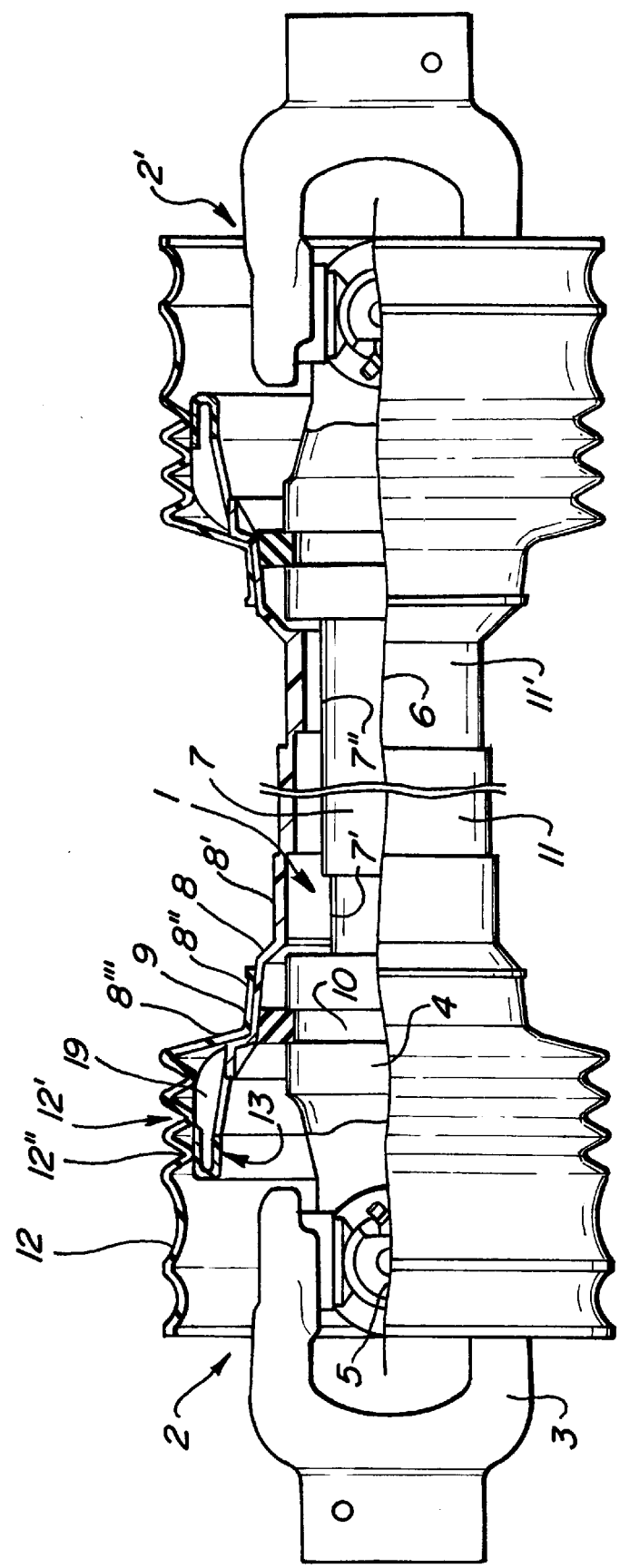
FIG. 1 is half a longitudinal section view through an agricultural driveshaft with a protective device in accordance with the invention.
Figure 2:
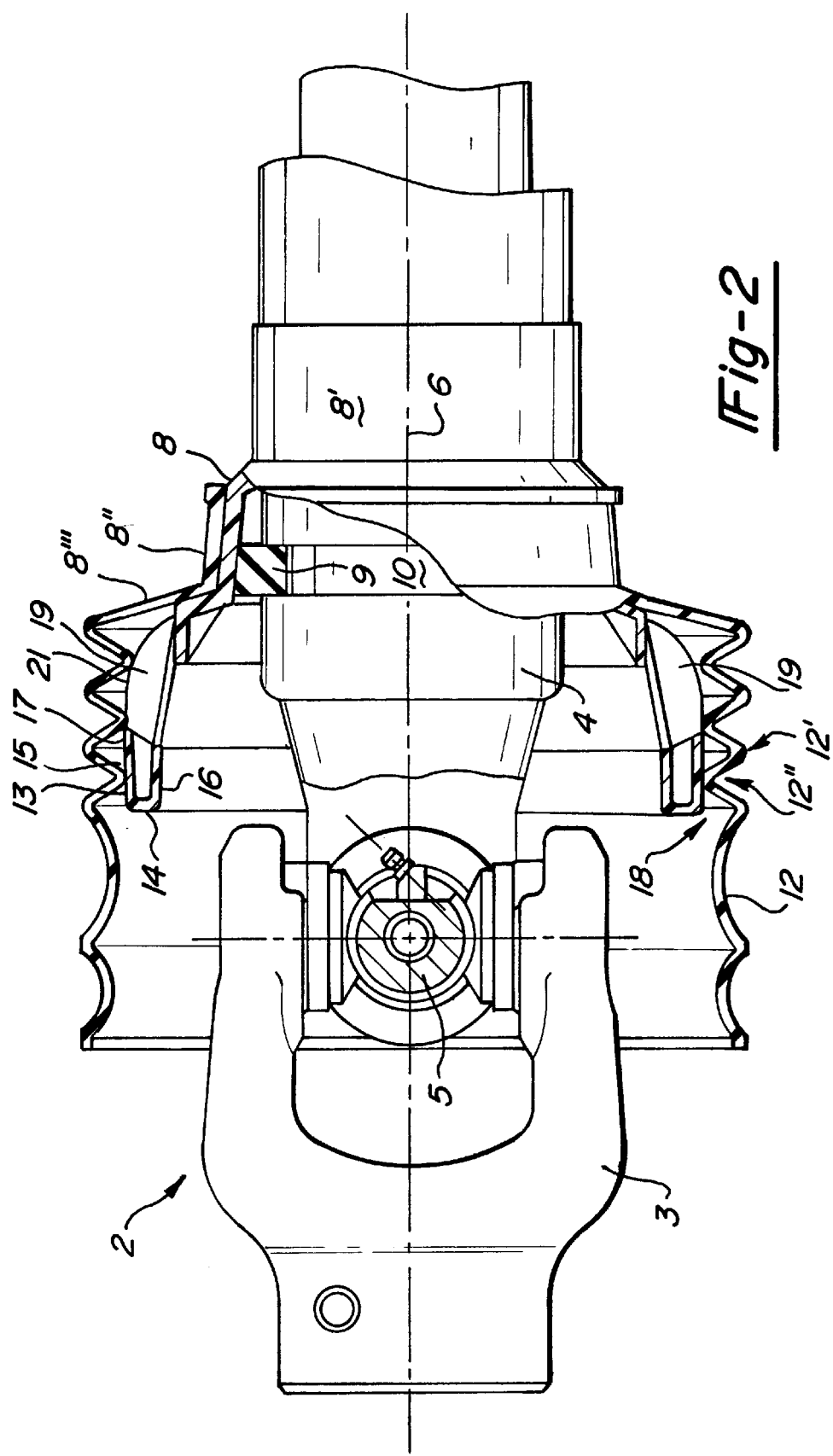
FIG. 2 is an enlarged part section view of the joint as illustrated on the left in FIG. 1, with the connecting cap and supporting ring in detail.

FIG. 1 illustrates a driveshaft 1 with two universal joints 2, 2' at its two ends. The two universal joints 2, 2' are substantially identical. Accordingly, only one of the joints, the universal joint 2 shown on the left in FIG. 1, is described in greater detail. Reference is also made to FIG. 2. The universal joint 2 includes two joint yokes 3, 4 which are articulatably connected to one another by a cross member 5. The two universal joints 2, 2' are connected to one another by a connecting shaft 7. The connecting shaft 7 includes two telescopic profiled tubes 7', 7" which are inserted into one another and enable transmission of torque between the two universal joints 2, 2'.

FIG. 1 shows the driveshaft 1 in an aligned position. The longitudinal axis 6 constitutes the rotational axis during the transmission of torque between the two joints 2, 2'.

For torque transmitting purposes, the two profiled tubes 7', 7" include a cross-section which deviates from a circular cross-section. One profiled tube 7' and 7" each is connected to the associated joint 2 and 2' respectively.

The driveshaft 1 is associated with a protective device which prohibits operatives from contacting the driveshaft 1 during its rotation. The protective device includes one connecting cap per universal joint 2, 2'. As is particularly obvious from FIG. 1 with reference to joint 2 and from FIG. 2, the connecting cap 8 includes a tube connector 8' for an outer protective tube 11. The second protective tube 11' is connected to the connecting cap of the second universal joint 2'. Furthermore, the connecting cap 8 includes a seat portion 8" to secure a protective cone 12 and a connecting portion 8"' connected to a supporting ring 13. The connecting cap 8 is associated with a sliding ring 9. The sliding ring 9 is slotted and engages a groove 10 in the joint yoke 4 of the universal joint 2 to support the protective device.

Towards the connecting cap 8, the protective cone 12 includes a portion 12' with folds, which include a plurality of folds with fold peaks and fold valleys 12". Towards the joint yoke 3, the protective cone 12 includes a portion which is relatively stiff. The portion 12' with the folds enables the protective cone 12 to be compressed towards the connecting cap 8. The compression enables access to the joint yoke 3 and enables connection to the power take-off shaft of a tractor. The connection achieves a rotationally secure connection. The protective cone 12 cooperates with a fixed guard, for example at the rear of the tractor. The fixed guard is partially covered so that an enclosed space is obtained which is only accessible by deliberately compressing the protective cone 12. Any contact with rotatable components is thus prevented.

The protective cone should be deformable to provide access to the joint components. Nevertheless, the protective cone should also ensure that damage does not occur and that the protective function is not reduced if the operative, for example, steps onto the guard or protective cone 12 while the driveshaft 1 is rotating or supports himself in any other way on the protective cone.

Figure 3:
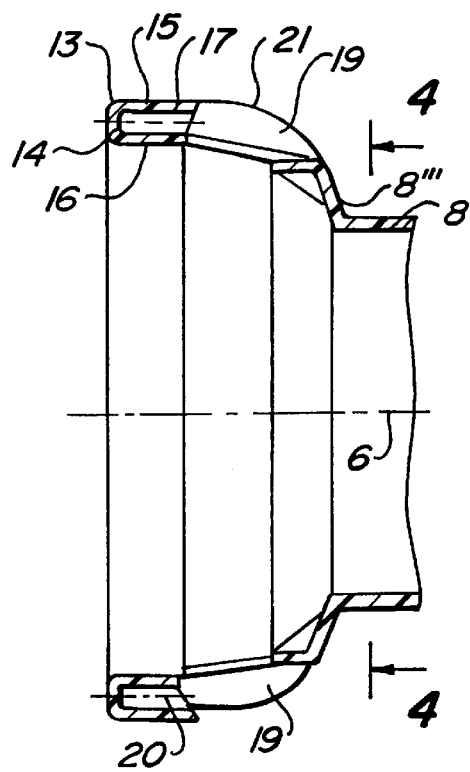
FIG. 3 is a cross-section view along line III—III of FIG. 4 of the protective cap according to FIG. 2.
Figure 4:
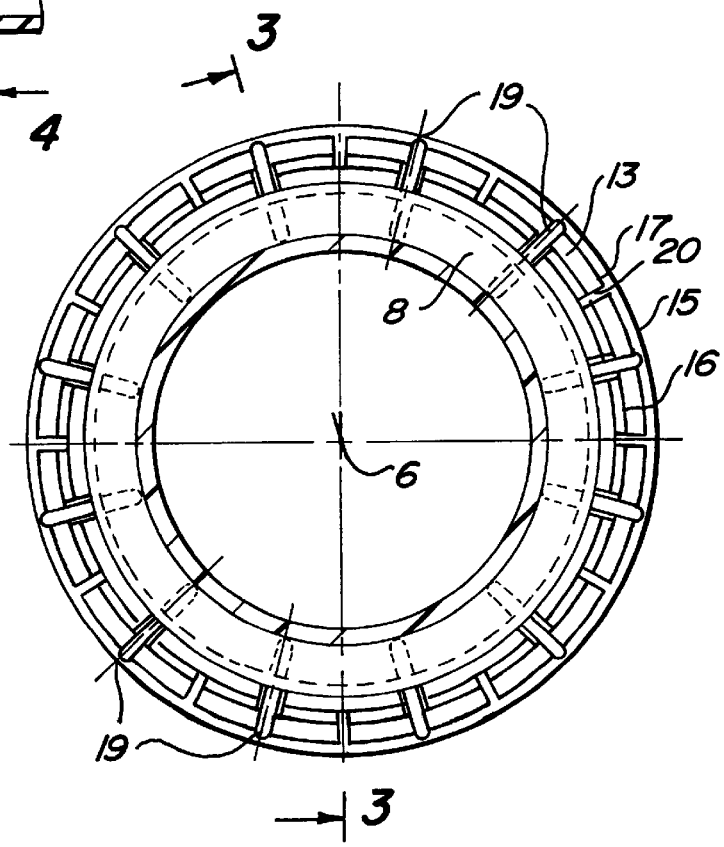
FIG. 4 is a section view along line 4—4 of FIG. 3.

To enhance the protective function, a supporting ring 13 is connected to the connecting portion 8"' of the connecting cap 8 by spokes 19 extending parallel to the longitudinal axis 6. The supporting ring 13 is arranged on the longitudinal axis 6 offset from the connecting cap 8 and sliding ring 9 at an axial distance to the left in the direction of the further joint yoke 3. As can be seen in FIGS. 3 and 4, the connecting cap 8 is expanded in the connecting portion 8"'. On its inside, the connecting cap 8, towards the longitudinal axis 6, is provided with reinforcing ribs. The circumferentially distributed spokes 19 which end in the supporting ring 13 start from the outside of the connecting portion 8"'.

The supporting ring 13 is provided in the form of a horizontally positioned U-profile. The opening of the points towards the connecting cap 8. The U-profile includes an outer arm 15, inner arm 16 and web 14 which connects the two arms. The outer face of the supporting ring 13 has been given the reference number 17 and supports the protective cone 12. The outer contour—21—of the spokes 19 has the same function. The spokes 19, in the form of reinforcing ribs, continue into the portion of the supporting ring 13, positioned between the two arms 15, 16. Additional reinforcing webs 20 are also provided which extend between the web 14 and the two arms 15, 16 to improve the strength of the supporting ring 13. The reinforcing webs 20 are distributed across the circumference of the supporting ring 13 between the spokes 19. The connecting cap 8 and the supporting ring 13, together with the spokes 19, which connect both, form one single component provided in the form of an injection-molded part made of HDPE.

As can be seen in FIGS. 1 and 2, the outer face 17 of the supporting ring 13 and the outer contours 21 of the spokes 19 serve to support the inner face 18 of the supporting funnel 12, especially in the region of the portion 12' with folds, preferably the folds of the portion 12' below the fold valleys 12". The supporting ring 13 effectively ensures that even if the protective cone 12 is subjected to radial loads, the protective cone 12 cannot contact the components of the universal joint 2 which it surrounds.

While the above detailed description describes the preferred embodiment of the present invention, the invention is susceptible to modification, variation and alteration without deviating from the scope and fair meaning of the subjoined claims.

We claim:

1. A protective device for a driveshaft, with the driveshaft including two universal joints each having two joint yokes and a cross member articulatably connecting the two joint yokes, as well as a connecting shaft connecting the two universal joints and extending along a longitudinal axis with each universal joint, said protective device comprising:

a connecting cap adapted for connecting with one of the joint yoke;

a protective cone connecting with said connecting cap;

an intermediate sliding ring coupled with said connecting cap, said sliding ring adapted to be supported on the joint yoke, said protective cone being of a plastic material and, starting from the connecting cap, adapted to cover the universal joint along at least part of the length of said universal joint;

supporting means which counteract any contact between the protective cone and the enclosed components of the universal joint if the protective cone is subjected to any external loads, said supporting means including a supporting ring the outer circumferential face of said supporting ring supporting the protective cone on part of an inner face of said protective cone and said supporting means including further connecting means connecting the support ring to the connecting cap and holding the supporting ring at an axial distance from the connecting cap along the longitudinal axis.

2. A protective device according to claim 1, wherein the supporting ring is attached to the connecting cap by spokes distributed around the longitudinal axis.

3. A protective device according to claim 2, wherein the supporting ring, the spokes and the connecting cap are produced in one piece as a plastic injection-molded part.

4. A protective profile according to claim 2, wherein at least some of the spokes form reinforcing webs.

5. A protective device according to claim 2, wherein in addition to the outer circumferential face of the supporting ring, also part of the outer contour of the spokes serves to support the protective cone.

6. A protective device according to claim 2, wherein towards the connecting cap, the protective cone includes a portion which is provided with folds including fold valleys and said supporting ring, the outer contour of the spokes, or both, serve to support the inner face of the fold valleys.

7. A protective device according to claim 1, wherein in a sectional plane containing the longitudinal axis, the supporting ring is provided with a wall profile in the form of a horizontal U-profile and that between arms and a web of the U-profile reinforcing webs are provided which are circumferentially distributed around the longitudinal axis.

* * * * *